United States Patent [19]

Whiteley

[11] Patent Number: 4,826,094
[45] Date of Patent: May 2, 1989

[54] VIBRATION DAMPER

[75] Inventor: John Whiteley, Lancashire, England

[73] Assignee: Hollingsworth (U.K.) Limited, Orn, United Kingdom

[21] Appl. No.: 60,279

[22] Filed: Jun. 10, 1987

[30] Foreign Application Priority Data

Jun. 12, 1986 [GB] United Kingdom ............... 8614322

[51] Int. Cl.⁴ ..................... B65H 54/42; B61K 7/02; F16F 9/50
[52] U.S. Cl. .................... 242/18 DD; 188/282; 188/317; 267/221
[58] Field of Search ............. 242/18 DD, 18 B, 18 R, 242/65, 66; 188/282, 316, 317, 279, 280, 281; 267/221

[56] References Cited

U.S. PATENT DOCUMENTS

| | | | |
|---|---|---|---|
| 2,719,612 | 10/1955 | de Previnquieres . | |
| 2,800,981 | 7/1957 | Allinquant . | |
| 3,016,205 | 1/1962 | Barnes, Jr. ................... | 242/18 DD |
| 3,043,404 | 7/1962 | Peras ................... | 188/280 |
| 3,299,990 | 1/1967 | Ratcliffe ................... | 242/188 DD X |
| 3,419,113 | 12/1968 | Shelley ................... | 188/280 |
| 4,126,302 | 11/1978 | Curnutt ................... | 267/221 |
| 4,407,396 | 10/1983 | Sirven ................... | 188/282 |
| 4,474,271 | 10/1984 | Molders et al. ................... | 188/282 |

FOREIGN PATENT DOCUMENTS

| | | |
|---|---|---|
| 1132905 | 12/1964 | Fed. Rep. of Germany . |
| 2323361 | 11/1974 | Fed. Rep. of Germany . |
| 1381387 | 11/1964 | France . |

*Primary Examiner*—Stanley N. Gilreath
*Attorney, Agent, or Firm*—Cort Flint

[57] ABSTRACT

A damper assembly comprises a cylinder enclosing a plunger mounted on a piston rod and associated with an auxiliary plunger which is yieldably held against the main plunger by a spring. Ascent of the cylinder relative to the plunger allows a high damping force to be obtained by causing the damping liquid to pass around the exterior of the main plunger, along a first flow path, whereas descent of the cylinder allows the spring to yield and to open a larger cross-section third flow path between the auxiliary plunger and the main plunger for a lower damping force to be obtained. The damping force exerted in the first-mentioned direction is limited by the effect of a pressure relief valve which opens to allow flow of hydraulic fluid through the auxiliary plunger along a second flow path once a predetermined damper force has been attained. The cylinder is coaxially surrounded by a pre-load spring. The damper is incorporated in an anti-bounce package support in a yarn winder.

17 Claims, 3 Drawing Sheets

VIBRATION DAMPER

FIELD OF THE INVENTION

The present invention relates to a vibration damper, and in particular to a damper which can be used for providing a firmer damping action in a first direction and a softer damping action in the reverse direction. For example, such a damper can be used in a textile yarn winding mechanism where the package of the yarn being traversed on a support bobbin is driven by frictional engagement with a drive roller and bouncing of the package relative to the drive roller is to be prevented in order to maintain a constant tension in the yarn being wound.

OBJECTS OF THE INVENTION

In such an application, it is helpful for the firmer damping action to resist lifting of the package clear of the friction drive roll during winding. It is an object of the present invention to provide a damper enabling, this same firmer damping action to be overcome by the package lift mechanism when drive to the package is to be interrupted.

It is a further object of the invention to provide a package winder in which the damping action can be much reduced when the package is moving in the direction towards the friction drive roller.

SUMMARY OF THE INVENTION

The present invention provides a damper comprising a cylinder; a plunger supported on a piston rod and movable axially in the cylinder in first and second opposed direction; means defining a first fluid flow path and a second fluid flow path in the first direction of movement of the plunger relative to the cylinder and a third fluid flow path in the second direction of movement of the plunger relative to the cylinder, the first fluid flow path being higher in resistance than the said second and third flow paths; and force limiting and reducing means which effect the transition from the first fluid flow path to the second fluid flow path in the first direction of movement upon attainment of a threshold displacement velocity in the first direction. The higher flow resistance of the first flow path signifies that it offers a higher damping factor than do the second and third flow paths.

Such a damper enables rapid movement of the damped assembly, and a reduction in the displacement-resisting force as the magnitude of the velocity increases, in a first direction once the force limit has been overcome, but always ensures a much reduced damping action in the second direction. For example, when the damper is incorporated in a textile winder, movement in the first direction may correspond to lifting of the package clear of the surface of the friction drive roller and such movement is to be avoided if at all possible and therefore is subjected to a damping action which is higher than the damping on return movement of the package towards the friction drive roller. From time to time it is necessary to lift the package clear of the drive roller to disengage drive, and in that case the lifting mechanism only has to provide enough initial force to attain the limited damping in the first direction, and this avoids overloading of the package lift mechanism during the later part of its travel.

BRIEF DESCRIPTION OF THE DRAWINGS

In order that the present invention may more readily be understood the following description is given, merely by way of example, with reference to the accompanying drawings in which.

DESCRIPTION OF THE PREFERRED EMBODIMENT

Figure 1:
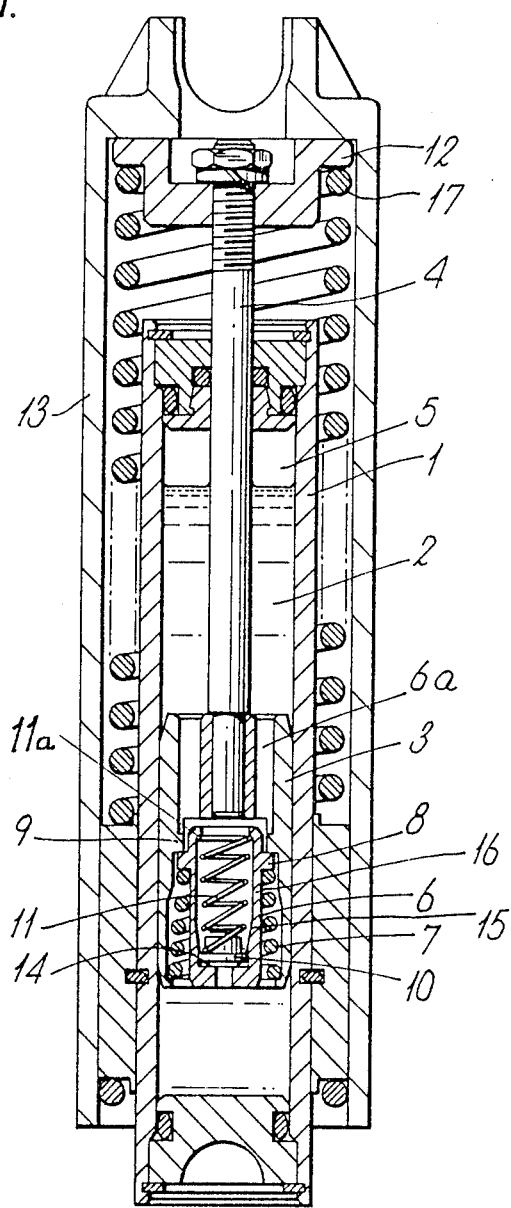
FIG. 1 is a longitudinal sectional view of a damper in accordance with the present invention.

In FIG. 1, the damper comprises a cylinder 1 enclosing a damping liquid 2 within which a plunger 3 on a slidable piston rod 4. An air space 5 remains at the top of the cylinder 1, the volume of the air space being such as to allow the piston rod 4 to descend into the cylinder 1 without generating an 'hydraulic lock'.

The plunger 3 includes at its bottom end a one way valve generally designated 16 comprising an auxiliary plunger 6 and an internal bead 9 of the plunger 3. The auxiliary plunger 6 is biased towards the middle of the main plunger 3 by means of a helical compression spring 7 between a flange 8 near the upper end of the auxiliary plunger 6 and an internal bead 9 of the main plunger 3 so that the flange 8 of the auxiliary plunger 6 mates sealingly with the internal bead 9 of the main plunger body 3. As can be seen in FIG. 1, the biasing spring 7 for the one way valve 6 is of generally conical form.

The auxiliary plunger 6 has a pressure relief valve formed within it as a valve member 10 biased towards a closing position by means of a helical compression spring 11 whose other end bears on an inwardly extending beam 11a at the top end of the auxiliary plunger 6. The main plunger 3 is firmly supported on the piston rod 4. The one way valve 16 opens easily to allow fast extension of the damper assembly and the pressure relief valve 10 opens rapidly within the auxiliary plunger 6 at a predetermined pressure to allow fast contraction of the assembly.

In use of the damper to damp relative movement between two components, not shown, the cylinder 1 is connected at its lower end to a first component, for example the main frame of the winder, whilst the upper end of the piston rod is secured to a stop member 12 forming part of an outer housing 13 which can be secured, at its upper end, to the second component (for example the package arms of a yarn winder).

In order to explain the operation of the damper, let it be assumed that the cylinder 1 is moving downwardly relative to the piston rod 4, starting from the position shown in the drawing. For this movement to occur, the damper fluid 2 must move downwardly past the plunger, and in so doing it endeavours to pass between the extreme outermost cylindrical surface of the main plunger 3 and the radially inwardly facing cylindrical wall of the cylinder 1 but to a greater extent down axial holes 6a in the auxiliary plunger, referred to herein as the third flow path, because the pressure differential thus building up across the main plunger 3 from one side to the other quickly overcomes the action of the spring 7 and displaced the auxiliary piston 6 downwardly so as to break the seal between the flange 8 of the auxiliary plunger and the internal bead 9 of the main plunger, giving the descending damper fluid a path of lower resistance as it passes axially through the lower end of the main plunger 3 in an outward direction. This is termed the second direction of movement, where the damping action, i.e., flow resistance, of the third flow path is reduced because of the opening of the shut-off valve formed by the auxiliary plunger 6 movable relative to the main plunger 3. This mode of operation corresponds to the graph, FIG. 4.

When the cylinder 1 moves upwardly relative to the piston rod 4, (termed herein as movement in the first direction), the damper liquid must rise past the plunger and in so doing will hold the auxiliary plunger 6 firmly against the main plunger 3 to maintain closed the shut-off valve formed by the auxiliary plunger 6, and hence shut the axial holes 6a. The only path for the hydraulic fluid to follow is the long passage between the exterior of the main plunger 3 and the interior of the cylinder 1 namely the first fluid flow path; because the radial gap is much smaller here than the gap between the interior of the main plunger 3 and the exterior of the auxiliary plunger 6 the damping force will be much higher in this first direction of movement. This mode of operation corresponds to the portion A-B in the graph, FIG. 3.

However, when the axial force applied to the main plunger 3 raises the fluid pressure to a given threshold value, the spring 11 is overcome and the pressure relief valve member 10 is able to rise off its seat, exposing its full cross-sectional area to the hydraulic fluid. This reduces and limits the axial force required to hold it open by a factor of, say, 10. This is shown in the portion B-C of the graph in FIG. 3.

As the valve member 10 rises it leaves the substantially cylindrical bottom portion 14 of its bore in the auxiliary plunger 6 and enters a divergent bore portion 15. At this point, the resistance to fluid flow drops rapidly and the valve settles in this position. The fluid pressure and, consequently the piston force, rise to the point designated D in the graph of FIG. 3, typically about 1/6 of the load at B. At an even higher piston velocity there is a slight increase of piston force with speed as shown in the portion D-E of the graph in FIG. 3. The shape and configuration of the internal bore of the auxiliary plunger 6 and the valve member 10 form the force-reducing and -limiting means. The path past the valve 10 through the holes 6a is the second fluid flow path.

As a result, the damper in accordance with the present invention provides a compact unit which has the following characteristics:

(a) In a first direction of movement (lifting of the package) a relatively high damping force is exerted so as to resist natural vibration tending to lift the package intermittently out of contact with its drive roller,but the magnitude of the damping force rapidly drops once an initial lifting threshold force and lifting threshold velocity have occurred due to mechanical lifting of the package for doffing purposes or for re-piecing in the event of a yarn break.

(b) In a second direction of movement (descent of the package towards the drive roller) the damping effort is greatly reduced thereby allowing a pre-load spring, and to some extent gravity, to assist in holding the package in contact with its friction drive roller during normal vibration tendencies mid-way through a package wind.

The two end caps of the cylinder 1 are equipped with seals (illustrated in the drawings but not referenced), and furthermore the upper end cap is provided with a suitable internal seal with the piston rod 4 slidable therethrough, to prevent leakage of the damper liquid.

A further important characteristic of the damper is that it includes the above-mentioned pre-load spring built-in as spring 17 which allows the damper unit to serve as a spring-damper combination. As shown in the drawing, the helical compression spring 17 surrounding the cylinder 1 serves to urge the cylinder 1 downwardly (i.e. in its second direction relative to the piston rod 4) corresponding to movement of the yarn package towards its friction drive roller. Thus the spring 17 maintains the package at all times firmly held against the friction drive roller. The force of the spring 17 is of course, in operation, supplemented by the weight of the package and its support spindle, as well as the weight of the package support arms. The spring 17 not only serves to act as a weighting means for the yarn bobbin, but also as a backlash-free connection between the damper and the package. This results in a much more positive damping action than that which would obtain with a separately mounted spring and damper.

Figure 2:
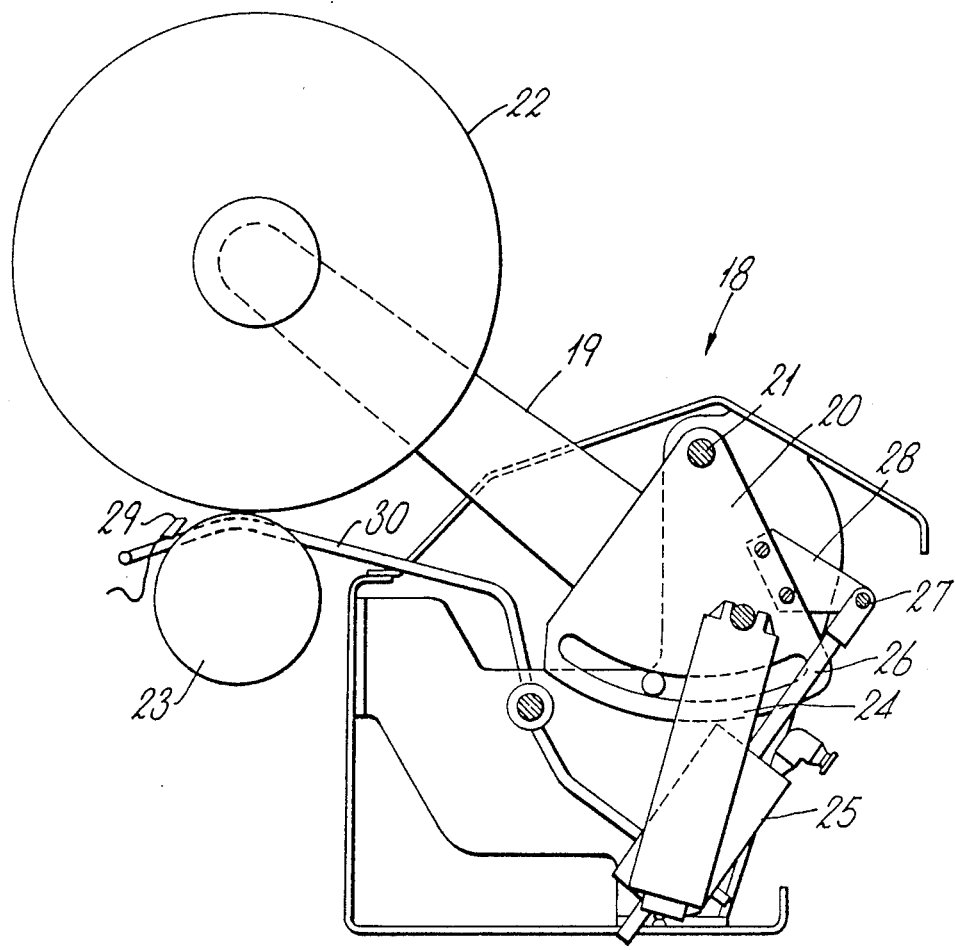
FIG. 2 is a sectional view, showing a yarn winder incorporating the damper of FIG. 1.

The yarn winder incorporating the damper illustrated in FIG. 1 is generally designated 18 in FIG. 2 and comprises spaced package arms 19 of which one can be seen in FIG. 2, connected to a drive segment 20 pivoted at 21. As the drive segment 20 pivots in the clockwise direction the package 22 lifts away from the friction drive roller 23 and simultaneously the spring damper of FIG. 1, generally designated 24 in FIG. 2, becomes compressed as described above. The lifting of the package is triggered by a package lift ram 25 having a piston rod 26 articulated at 27 to a bracket 28 on the drive quadrant 20. The package lift ram 25 may, for example, be as disclosed in our U.S. Pat. No. 4,684,074.

FIG. 2 also shows a traverse guide 29 and a yarn lifting bar 30 which automatically lifts the yarn out of the traverse guide 29 upon operation of the package lift ram 25 to pivot the drive quadrant 20 clockwise.

The geometry of the winder is such that the piston rod 26 is substantially perpendicular to the line joining its articulation pivot 27 to the main pivot spindle 21 throughout the full range of bobbin diameters occurring during winding, thus optimising the leverage exerted by the ram.

When winding, it is desirable for the spring force on the bobbin to reduce as the bobbin diameter increases (to give a relatively constant weight on the winding zone). This means that the damping foce will also reduce at the same time. The initial degree of damping must be set at a sufficiently high level to allow for this reduction.

It is advantageous to a use relatively long fluid leakage path to define the first damping liquid flow path so that its cross-section (e.g. the clearance around the outer cylindrical surface of the main plunger body 3) can be as large as possible and therefore the effects of manufacturing tolerances on the damping force are minimised.

The pressure relief valve 10 may, instead, be a ball, again spring-biased against its seat, but this time the seat would need to be a concave part-spherical seat, or a soft seat capable of sealing against the spherical valve member, as distinct from the flat seat shown in FIG. 1.

Figure 3:
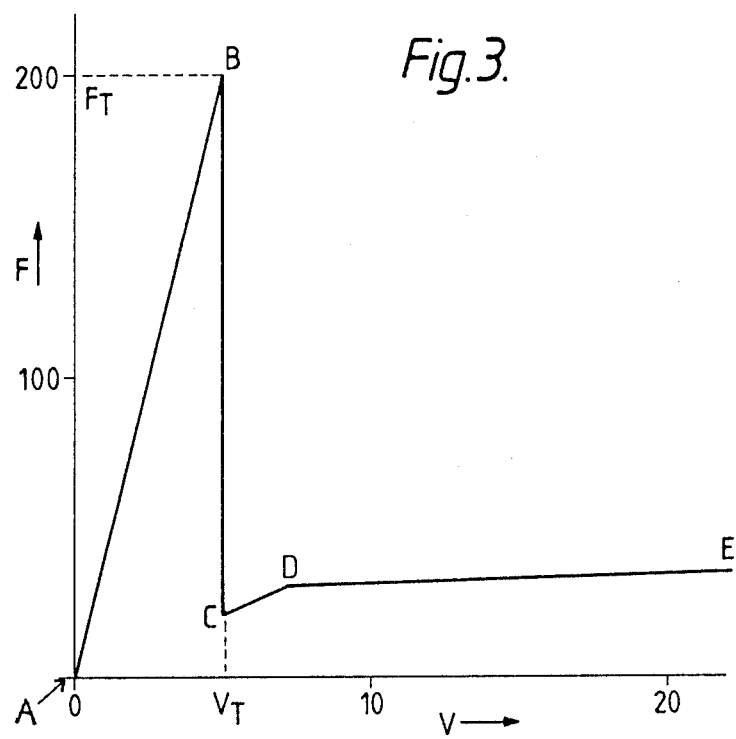
FIG. 3 is a graph plotting damping force against displacement velocity during movement in the first direction.

FIG. 3 shows a graph of the damping force measured in Newtons plotted against the displacement velocity measured in millimeters per second during movement of the plunger in the first direction.

During the portion A-B there is a substantially constant gradient signifying normal damping action such that the damping force increases as the velocity increases.

At point B the pressure relief valve member 10 rises off its seat in the auxiliary plunger 6 and immediately presents the whole of its area to the relative upthrust of the damping fluid 2 (as opposed to the limited central portion which is exposed to the bore in the auxiliary plunger 6 before the valve member 10 has started to rise). The extra exposed area on the underside of the valve member 2 causes an increased upward force, lifting the plunger out of the cylindrical bottom portion 15 and allowing a considerable reduction in the flow resistance such that the damping force F drops to a value at velocity $V_T$(point C) which is substantially 10% of the force $F_T$ at the point B when the valve member 10 starts to lift.

The graph portion C-D of FIG. 3 correspond to arrival of the pressure relief valve member 10 in the divergent portion 15 of the bore in the auxiliary plunger 6, and from then on the rate of increase of damping force F with increasing displacement velocity V is still further reduced along the portion D-E.

Figure 4:
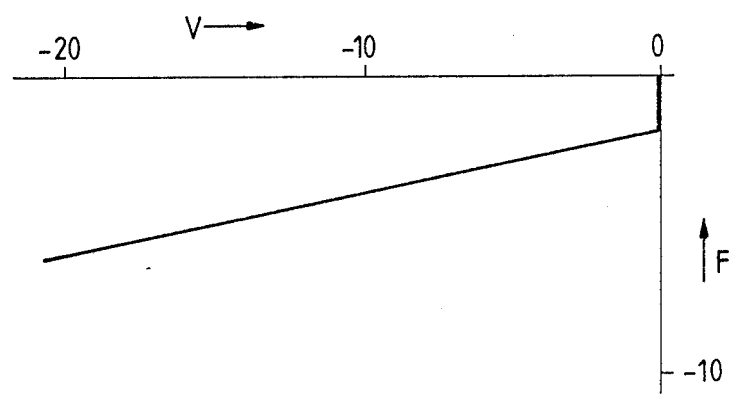
FIG. 4 is a graph of damping force against displacement velocity in the second direction but on an expanded ordinate.

FIG. 4 shows the situation when the plunger 3 is moving in the reverse direction. Initially there is a very steep gradient portion as the damping force goes negative until a value of around −2 Newtons when the gradient suddenly drops as the yielding of spring 7 allows the auxiliary plunger 6 to descend off its seat 9 in the main plunger 3.

It is quite clear, comparing the gradients of the portion A-B of FIG. 3 (corresponding to fluid flow movement along the first path) with the shallower graph portion of FIG. 4 (corresponding to fluid flow movement along the third path) that the rate of increase of damping force with velocity (the damping factor) is much higher along the first fluid flow path than along the third fluid flow path.

Similarly, a comparison of the gradients of portions A-B and C-D of FIG. 3 shows a rapid reduction in damping factor during flow movement along the second fluid flow path (regime C-D of FIG. 3).

As can be seen from FIG. 3, there is a marked difference in the damping force F before and after the pressure relief valve member 10 rises at displacement velocity $V_T$ such that the force at point C is less than one half of the value of the force at point B, and in this case is substantially 1/10 of the force at B.

For the sake of clarity it should be appreciated that where the damping force F is the force opposing movement with a displacement velocity V, then the damping factor K is equal to F/V and will be measured in $Nms^{-1}$ where the damping force is in Newtons and the displacement velocity is measured in $ms^{-1}$.

Throughout the description above it has been assumed that K is a constant although in practice there is a temperature dependence caused by thermal expansion of the structural components in the damper and by changes in the oil viscosity with temperature. It is possible to compensate for the temperature dependence by selecting combinations of materials having appropriate thermal expansion coefficients which balance the changes in the viscosity. However, the damping factory may also vary if flow velocities inside the damper become high enough to give a Reynolds number above $10^3$, although in practice this condition is unlikely to occur with the displacement velocities encountered in the example of damper described.

I claim:

1. A damper comprising:
   (a) a cylinder;
   (b) a piston rod in said cylinder;
   (c) a plunger supported on said piston rod and movable axially in the cylinder in first and second opposed directions;
   (d) means defining a first fluid flow path and a second fluid flow path in the first direction of movement of the plunger relative to the cylinder;
   (e) means defining a third fluid flow path in the second direction of movement of the plunger relative to the cylinder, the first fluid flow path being smaller in cross-section than the said second and third flow paths whereby upon relative movement between the cylinder and the piston rod in a first direction a higher movement-resisting axial force acts on the cylinder and piston rod than when moving in a second direction opposite thereto; and
   (f) axial force-limiting and -reducing means which effect the transition from the first fluid flow path to the second fluid flow path in said first direction of relative movement upon attainment of a threshold displacement velocity of said relative movement in said first direction; wherein said axial force -limiting and -reducing means include reduced force maintaining means which maintains the force substantially at its reduced level for a significant range of displacement velocities beyond said threshold displacement velocity.

2. A damper according to claim 1, wherein said axial force-limiting and -reducing means includes force reduction effecting means which effects reduction of the movement-resisting force in said first direction to a value less than one half of the axial force applicable as said threshold displacement velocity of relative movement is attained.

3. A damper according to claim 2, wherein the axial force reduction is substantially 10:1.

4. A damper according to claim 1, including a second plunger auxiliary to and within the first-mentioned plunger and slidable relative thereto; and wherein said third flow path is defined between said first-mentioned plunger and said second plunger which define between them an annular passage having a lower resistance than said first flow path.

5. A damper according to claim 4, including means fixing said first-mentioned plunger on said piston rod, wherein said third fluid flow path comprises axial passage means through the first-mentioned plunger generally closed by closing means in the second plunger and opened by movement of the second plunger relative to the first-mentioned plunger.

6. A damper according to claim 5, wherein said second plunger includes means defining a valve seat; and wherein said axial force-limiting and -reducing means comprise a pressure relief valve member housed within the second plunger and a spring yieldably biasing said pressure relief valve member against said valve seat.

7. A damper according to claim 5, including a coil spring coaxially surrounding the second plunger and within the first-mentioned plunger, and effective to bias said second plunger into its position closing said third fluid flow path; said spring yielding to allow the second plunger and the first-mentioned plunger to separate slightly from one another to allow movement of damper liquid therebetween along said third flow path.

8. A damper according to claim 1, and including spring means biasing said cylinder in said first direction relative to the plunger for pre-loading the damper.

9. A yarn winder mechanism including:
   (a) winder frame means;
   (b) a package friction drive roller;
   (c) means mounting the friction drive roller for rotation about an axis which is stationary relative to said winder frame means;
   (d) a package carrier movable relative there to said drive roller; and
   (e) a damper connected between said package carrier and said winder frame means which includes:
      (i) a cylinder;
      (ii) a piston rod in said cylinder;
      (iii) a plunger supported on said piston rod and movable axially in the cylinder in first and second opposed directions;
      (iv) means defining a first fluid flow path and a second fluid flow path in the first direction of movement of the plunger relative to the cylinder;
      (v) means defining a third fluid flow path in the second direction of movement of the plunger relative to the cylinder, the first fluid flow path being smaller in cross-section than the said second and third flow paths whereby upon relative movement between the cylinder and the piston rod in a first direction a higher movement -resisting axial force acts on the cylinder and piston rod than when moving in a second direction opposite thereto; and
      (vi) axial force -limiting and -reducing means which effect the transition from the first fluid flow path to the second fluid flow path in said first direction of movement upon attainment of a threshold displacement of velocity of movement of said piston rod relative to said cylinder in said first direction wherein said axial force -limiting and -reducing means include reduced force maintaining means which maintains the axial movement resisting force substantially at its reduced level for a significant range of displacement velocities of movement beyond said threshold displacement velocity of movement.

10. The apparatus of claim 9, wherein said first direction corresponds to movement of said yarn package carrier away from said friction drive roller and said second direction corresponds to movement of said yarn package carrier towards said friction drive roller.

11. The apparatus according to claim 9, wherein said axial force -limiting and -reducing means includes force reduction effecting means which effects reduction of the movement-resisting axial force in said first direction to a value less than one half of the axial movement-resisting force applicable as said threshold displacement velocity of movement is attained.

12. The apparatus according to claim 11, wherein the axial force reduction is substantially 10:1.

13. The apparatus according to claim 9, including a second plunger auxiliary to and within the first-mentioned plunger and slidable relative thereto; and wherein said third flow path is defined between said first-mentioned plunger and said second plunger which define between them an annular passage having a lower resistance than said first flow path.

14. The apparatus according to claim 13, including means fixing said first-mentioned plunger on said piston rod, wherein said third fluid flow path comprises axial passage means through the first-mentioned plunger and opened by movement of the second plunger relative to the first-mentioned plunger.

15. The apparatus according to claim 14, wherein said second plunger includes means defining a valve seat; and wherein said force-limiting and -reducing means comprise a pressure relief valve member housed within the second plunger and a spring yieldably biasing said pressure relief valve member against said valve seat.

16. The apparatus according to claim 14, including a coil spring coaxially surrounding the second plunger and within the first-mentioned plunger, and effective to bias said second plunger into its position closing said third fluid flow path; said spring yielding to allow the second plunger and the first-mentioned plunger to separate slightly from one another to allow movement of damper liquid therebetween along said third flow path.

17. The apparatus according to claim 9, and including spring means biasing said cylinder in said first direction relative to the plunger for pre-loading the damper.

* * * * *

UNITED STATES PATENT AND TRADEMARK OFFICE
CERTIFICATE OF CORRECTION

PATENT NO. : 4,826,094

DATED : May 2, 1989

INVENTOR(S) : John Whiteley

It is certified that error appears in the above-identified patent and that said Letters Patent is hereby corrected as shown below:

On the title page assignee should read

--(73) Assignee: Hollingsworth (U.K.) Limited, Accrington, England--.

Signed and Sealed this

Twenty-fourth Day of April, 1990

Attest:

HARRY F. MANBECK, JR.

*Attesting Officer*    *Commissioner of Patents and Trademarks*